United States Patent
Chi

[19]

[11] Patent Number: 5,822,757
[45] Date of Patent: *Oct. 13, 1998

[54] COMPUTER SYSTEM WITH MULTI-BUFFER DATA CACHE FOR PREFETCHING DATA HAVING DIFFERENT TEMPORAL AND SPATIAL LOCALITIES

[75] Inventor: Chi-Hung Chi, Croton-On-Hudson, N.Y.

[73] Assignee: Philips Electronics North America Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 581,670

[22] Filed: Dec. 29, 1995

Related U.S. Application Data

[63] Continuation of Ser. No. 120,699, Sep. 13, 1993, abandoned, which is a continuation of Ser. No. 641,236, Jan. 15, 1991, abandoned.

[51] Int. Cl.$^6$ .................................................. G06F 13/00
[52] U.S. Cl. ........................ 711/129; 711/137; 711/119
[58] Field of Search .................................. 395/250, 445, 395/446, 450, 452, 456, 460, 461, 464, 486, 872, 876, 877, 447; 711/118, 119, 123, 125, 129, 133, 134, 137, 159

[56] References Cited

U.S. PATENT DOCUMENTS

| | | | |
|---|---|---|---|
| 4,437,149 | 3/1984 | Pomerene et al. | 395/389 |
| 4,594,659 | 6/1986 | Guenthner et al. | 395/383 |
| 4,701,844 | 10/1987 | Thompson et al. | 711/119 |
| 4,719,568 | 1/1988 | Carrubba et al. | 711/123 |
| 4,853,846 | 8/1989 | Johnson et al. | 395/281 |
| 4,926,323 | 5/1990 | Baror | 395/585 |
| 4,928,239 | 5/1990 | Baum et al. | 711/136 |
| 4,980,823 | 12/1990 | Lin | 711/136 |

FOREIGN PATENT DOCUMENTS

| | | |
|---|---|---|
| 0250702 | 1/1988 | European Pat. Off. . |
| 58-91570 | 5/1983 | Japan . |

OTHER PUBLICATIONS

"Decoder Initiated Prefetching For Long–Op Instructions," IBM Tech. Disc. Bull., vol. 32, No. 6A, Nov. 1989, pp. 127–128.

"Cache Memories" by A.J. Smith, Computing Surveys, vol. 14, No. 3, Sep. 1982, pp. 473–530.

*Primary Examiner*—Glenn Gossage
*Attorney, Agent, or Firm*—Brian J. Wieghaus

[57] ABSTRACT

A computer system including a multi buffer data cache and method of caching data based on predicted temporal and spatial localities. A processor operates on operands under instruction control, the operands being stored in a main memory. The processor is coupled to the main memory via a data cache for prefetch and storage of operands referenced by the instructions. The data cache comprises an S-buffer for storing operands with strong temporal locality, and a P-buffer for storing operands with strong spatial locality. A control unit connected to the processor, the buffers and the main memory, determines what type of locality is involved in the operand referenced, based on whether the instruction accesses the main memory in a direct or indirect addressing mode as determined by a decoder unit of the processor, and governs operation of the buffer associated with the type of locality determined. Data references may be classified into a plurality of groups, which may include data references to stack data or global variable data, on the basis of predicted statistical associations of localities of the data references. The processor may include a stack pointer register and the computer system may identify requests using the indirect addressing mode based on the stack pointer register.

6 Claims, 1 Drawing Sheet

COMPUTER SYSTEM WITH MULTI-BUFFER DATA CACHE FOR PREFETCHING DATA HAVING DIFFERENT TEMPORAL AND SPATIAL LOCALITIES

This application is a continuation of U.S. Pat. application Ser. No. 08/120,699, filed Sep. 13, 1993, now abandoned, which is a continuation of U.S. patent application Ser. No. 07/641,236 filed Jan. 15, 1991, also now abandoned.

CROSS REFERENCE TO RELATED APPLICATIONS

This application is related to U.S. patent application Ser. No. 07/526,341 filed May 18, 1990, now abandoned in favor of U.S. patent application Ser. No. 08/226,163, filed Apr. 8, 1994, that issued Dec. 5, 1995 as U.S. Pat. No. 5,473,764, and also to U.S. patent application Ser. No. 07/605,212 filed Oct. 24, 1990, now abandoned in favor of U.S. patent application Ser. No. 08/080,438 filed Jun. 21, 1993, which applications are incorporated herein by reference, as background material.

BACKGROUND OF THE INVENTION

The invention relates to electronic computer systems. More particularly, the invention relates to a computer architecture which permits an efficient exchange of data between a relatively fast processor and a relatively slow memory.

Rapid advances in integrated circuit technology and in computer architecture have resulted in an increasing "memory reference delay gap" between relatively fast processing units and relatively slow memory. High performance processor chips with maximum throughput over 100 million instructions per second (MIPS) are available as commercial products. Multiprocessor systems using these processor chips as their processing units can also be implemented. However, the memory system needed to allow these high performance systems to run at their peak speed is either too complex or too expensive to be built. As a result, the performance bottleneck of many current high performance computer systems may not be the speed of their processing units, but rather is the efficiency of the memory system.

In order to overcome the problem of increasingly large memory reference delay gap between the fast processing units and slow memory, the prior art teaches using a the cache memory. Cache memory is a small high speed buffer memory between the central processing unit and the main memory of a computer system. Its primary purpose is to obtain high speed data/instruction accesses without the associated cost of building the entire primary memory using high speed technology. This is achieved by keeping data/instructions that are expected to be referenced in the near future in cache. In current cache designs, instruction caches are always given a higher priority to be implemented and optimized than data caches. If only a limited amount of chip area is available, it will be used to implement an instruction cache. Very often, a data cache is put onto the processor chip only after the instruction cache has been implemented and if there is still space available. This is due to the current level of understanding of instruction reference behavior and data reference behavior and to the accuracy of current cache models for instructions and for data. Since instruction references have a strong sequential reference characteristic, the prior art teaches a technique known as "cache prefetching" in which references are brought into the cache memory before they are actually needed. If the prefetching is correct, memory reference delay times can be overlapped (partially or completely) with program execution. For non-sequential instruction references due to branch or jump instructions, the prior art teaches a technique known as "branch target prediction" to guess which way the program execution is to go. Together with the cache prefetching technique, the number of cache misses can be reduced if the guessing is correct. Furthermore, a "branch target buffer or cache" can also be used to improve the cache hit ratio by placing branch targets into one buffer/cache and placing non-branch references into another buffer/cache. Consequently, the number of cache misses visible to the processing unit can be reduced and good instruction cache performance can be obtained. As used herein, the term "cache hit ratio" is defined as the probability that a data item requested by a processor unit will be found in cache memory and the "cache miss penalty" is defined as the time that the processing unit has to wait for the requested data item to arrive when a cache miss occurs.

In the prior art, data reference behavior is generally considered "random" and there is no accurate model for the prior art data cache designs. As a result, those caching techniques that can improve instruction cache performance might become ineffective when they are applied to data caches. For example, cache prefetching techniques are relatively much less efficient in data caches than in instruction caches. Sometimes, they actually decrease the machine performance. This is mainly due to problems of cache pollution and bus contention. Herein, "cache pollution" refers to the situation where data or instructions are fetched into the cache but are not referenced during the time they are in the cache. "Bus contention" is a situation where there are more requests trying to use the data bus than the bus can simultaneously serve. Compared to the behavior of instruction references, which are usually sequential in nature, the overall behavior of data references is more or less random. Since, in the prior art, the reference behavior of data has been much less predictable than the reference behavior of instructions, cache pollution occurs much more seriously in data cache prefetching than in instruction cache prefetching. Cache space is not only wasted to store prefetched non-referenced data, but data in the cache that are going to be referenced shortly might be replaced by the non-referenced data. Fetching of non-referenced data also creates bus traffic. In systems where bus bandwidth is a limited resource, bus contention might occur and machine performance will be further deteriorated. If the bus is busy prefetching non-referenced data, other requests to use the bus (e.g. instruction fetching) might be delayed. This occurs very often in high performance processor chips where the processing speed can be very fast but the bus bandwidth is limited by its physical constraints, for example, the total number of pins on a chip. Branch technique prediction and the use of branch target buffer/cache are not applicable to data caches. In the prior art data cache designs, data references are not divided into different types according to its sequential reference behavior. The distinction of branch references from sequential references in instruction references does not occur in data references. Thus, the performance of current data cache designs is much less than the performance of instruction cache designs.

Since the introduction of the cache in the 1960's, cache partitioning and multi-buffer cache techniques are often used to improve the cache hit ratio and to reduce the bus traffic. Some of the most commonly used prior art cache partitioning techniques are:

DATA CACHE VS. INSTRUCTION CACHE—the cache space is divided into two mutually exclusive partitions, one for instruction storage and one for data storage.

CACHE PARTITION FOR REAL-TIME SYSTEMS—the cache space is divided into several partitions, only one of which will be assigned and used by a task each time the task is running.

ADDITION OF BRANCH TARGET CACHE—a separate buffer/cache, used to store only branch target instructions, is added onto the existing cache.

ADDITION OF PREFETCH BUFFER—a separate buffer, used to store only sequentially prefetched instructions, is added onto the existing cache.

ADDITION OF VICTIM CACHE or (or"MISS CACHE") a separate buffer/cache, used to temporarily save data that are just replaced from the cache, is added between the existing cache and the main memory.

All these techniques lose their effectiveness in data cache designs. The first technique (data cache vs. instruction cache) tries to avoid the interference of instruction references from data references in caches while the second technique (cache partitioning for real-time systems) tries to avoid the interference of instructions and data references of one task from instructions and data references from the other tasks. However, the problem of unpredictable data reference behavior remains. The third techniques (addition of branch target cache) cannot be applied in data caches because there are no branch targets in data references. The fourth technique (addition of prefetch buffer) is not very useful in improving data cache performance because the reference behavior of data is more or less random rather than sequential. Sequential prefetching in data references often deteriorates data cache performance instead of improving it. The last technique (addition of victim cache or miss cache) can improve the data cache performance slightly by adding more associativity to the cache. However, it still does not solve the problem of unpredictable data reference behavior.

A further discussion of the organization and construction of cache memory buffers and systems is found in "High-Speed Memory Systems", Pohm and Agrawal, Reston Publishing Company (1983) and in "Cache Memories", by A. J. Smith, *Computing Surveys*, Volume 14, Number 3, September 1982, pp. 473–530, which are incorporated herein, by reference, as background material.

SUMMARY OF THE INVENTION

Data references are divided into two types called S_References and P_References according to the addressing mode and the registers used in the address calculation. Data references from main memory are stored in a cache which comprises two buffers, an S_Buffer and a P_Buffer, each of which is optimized and used to handle one type of data reference. The S_Buffer is optimized for S_References and the P_Buffer is optimized for P_References. Each of these two types of references has its own distinct characteristics that are not shared by the other reference type. Thus, a significant improvement in cache performance is obtained with the multi-buffer data cache.

In current cache designs, program reference behavior is often explained by the principle of locality of reference. There are two types of locality references, "temporal locality" (or locality of time) and "spatial locality" (or locality of space). Over a short period of time, memory references made by a reference program are not uniformly distributed over the address space. Instead, references often occur in small clusters—the working set of references. The first type of locality, temporal locality, refers to the fact that information currently being used is likely to be used again in the near future. This is the basic rationale for most prior art caches: most programs attempt to use data or code more than once during program execution. This type of reference behavior can be found in program loops in which both data and instruction references are expected to be used repeatedly for each loop or in subroutines that are called several times during the program execution.

The address space usually is grouped into a number of individual contiguous segments of that space and only a few segments will be referenced repeatedly at the same time. The second type of locality, spatial locality, suggests that the loci of references of a program in the near future will be likely to be near the current loci of reference. This type of reference behavior is common in scientific programs where instructions are mostly executed in a sequential order and it is common to access sequences of array elements, which are typically contiguous in memory.

With these localities of time and space, the present invention attempts to keep information which the processor is currently working on (local in time), together with information near the current loci of references (local in space), in cache and readily available. However, it is generally agreed that this design principle works well in instruction caches, but not in data caches. This is due to the very different reference behavior between instructions and data. While instruction reference behavior has a strong sequential reference property and is highly predictable, the prior art teaches that data reference behavior is random and is much less predictable than instruction references. Since most of the current cache models in management schemes are primarily designed for instruction caches, it is not surprising that these schemes and control mechanisms are much less effective when they are applied to data caches. However, careful study shows that data reference behavior is actually not as random as it looks. In fact, it is a combination of S_References and P_References, and each of these two types of references is highly predictable. The first type of data references, the P_Reference, is mainly due to accesses of data array elements using pointers. It has strong sequential reference properties that are similar to the sequential reference property of instructions. Hence, the next reference of this type of data is highly predictable. That is, it possesses a strong forward (or perhaps backward) spatial locality of references. However, life span of cached P_References is usually very short, usually a few instructions, and the reference frequency of P_references is very low. This means that the temporal locality of P_References is very weak.

The second type of data references, the S_References, is mainly due to accesses of stack variables and global scalar variables. This type of references is usually referenced very often during their live range period. Thus, a strong temporal locality of reference property can be found in this type of references. However, the spatial locality of S_References is very weak because its access pattern is almost random.

By inspecting the addressing mode and the registers used in the address calculation during instruction decoding, data references can be ascertained to be S_References or P_References at run time with high accuracy. This is because only references using indirect addressing mode might be P_References and some registers are often designed for some specific purposes. For example, references using a direct addressing mode are likely to be S_References; indirect references using the stack pointer register are probably local stack variables.

By dividing data references into S_References and P_References, the locality of each of these two types of data reference can be described more accurately. Based on this data reference model, a computer system of the present invention includes a data cache having an S_Buffer which is optimized for prefetching and storing S_Reference data and a P_Buffer which is optimized for prefetching and storing P_Reference data. The data cache includes a control unit which analyzes the addressing mode and registers used in the address calculation during instruction decoding to determine if the reference data should be an S_Reference or a P_Reference.

BRIEF DESCRIPTION OF THE DRAWING

The invention will be described by reference to FIG. 1, the lone drawing FIGURE which illustrates a computer system with a data cache of the present invention.

DESCRIPTION OF THE PREFERRED EMBODIMENTS

Figure 1:
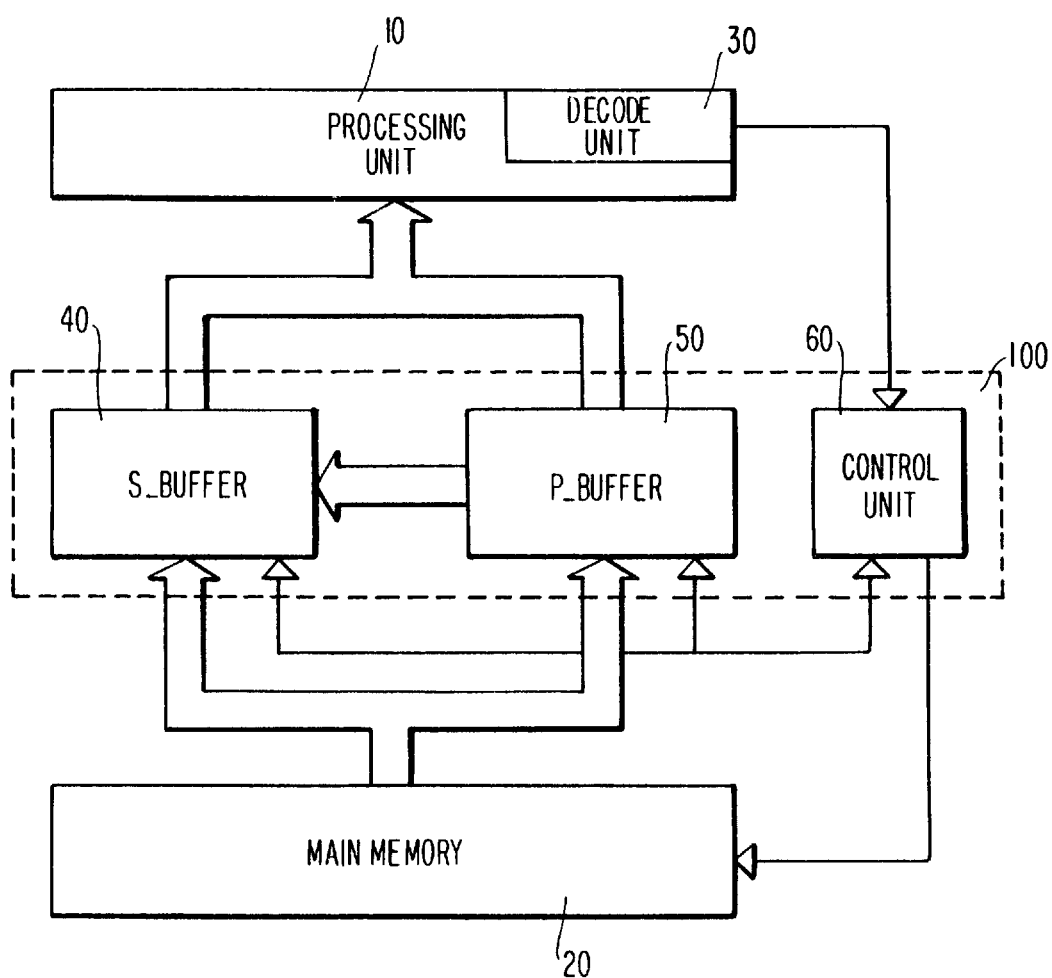

The FIGURE is a multi-buffer data cache of the present invention. The cache controls the fetching of data which is referenced by a processing unit 10 from a main memory 20. As is usual in the prior art, the processing unit includes a decode unit 30 which decodes instructions to determine, among other things, the types of data references contained therein and the registers used for indirect mode addressing.

A multi-buffer data cache 100 is connected between the main memory 20 and the processing unit 10. It consists of an S_Buffer 40, a P_Buffer 50, and a control unit 60. The control unit 60 regulates the flow of data so that each of the P_Buffer and S_Buffer has its own distinct unique features and control schemes to optimize one type of data reference: the S_Buffer is used to handle S_References and the P_Buffer is used to handle P_References. The buffers are otherwise constructed and connected in the manner of the prior art.

Whenever a data reference is found in some instruction, its addressing mode and the registers used in the address calculation are determined by the decode unit 30 and sent to the control unit 60 which determines whether it is an S_Reference or a P_Reference. This is done according to predefined rules which are incorporated in the control unit logic. For example, a reference that uses indirect addressing mode and uses the stack pointer register in its address calculation is considered to be an S_Reference. When a data reference is made, each of the two buffers is checked to determine whether there is a cache miss or a cache hit.

The S_Buffer is mainly used to store S_References. Since an S_Reference does not have a strong sequential reference priority, no sequential prefetching is used. This is because the serious cache pollution that data prefetching generates might result in performance deterioration instead of performance improvement. This is especially true if the S_Buffer size is small. When there is an S_Buffer cache hit on an S_Reference, there is no change in the content of the cache. When there is an S_Buffer cache hit for a P_Reference, there is no change in the content of the cache. When there is a cache miss for an S_Reference, the cache block corresponding to that miss is fetched from main memory into the S_Buffer.

The P_Buffer is used mainly to store P_References. Since there is a strong sequential reference property in P_References, sequential prefetching is used in the P_Buffer. When there is a P_Buffer cache hit on a P_Reference, there is no change in the content of the cache. When there is a P_Buffer hit for an S_Reference, the cache block corresponding to that reference is transferred from the P_Buffer to the S_Buffer. After the block transfer, the cache block in the P_Buffer that contains the current S_Reference is marked as empty. When there is a cache miss for a P_Reference, the cache block corresponding to the miss is fetched from main memory into the P_Buffer. All prefetched data is placed in the P_Buffer. A prefetching scheme which allows constantly prefetching can be used.

Although the invention has been described with respect to a two-buffer cache, it is not so limited. Additional cache buffers may be provided, in addition to the P_Buffer and the S_Buffer, with specific data fetching and storage characteristics which are optimized for other identifiable data reference types which have unique characteristics.

I claim:

1. A computer system comprising:

a processor for operating on operands under control of instructions;

a main memory for storage of the operands;

a data cache between the main memory and the processor for prefetch and storage of specific ones of the operands referenced by the instructions;

wherein the data cache comprises:

an S-buffer for storage of a plurality of the operands with strong temporal locality;

a P-buffer for storage of a plurality of the operands with strong spatial locality;

a control unit connected to the processor, the S-buffer, the P-buffer, and the main memory, for determining whether the operand referenced involves either the strong temporal locality or the strong spatial locality, and for thereupon controlling operation of a particular one of the buffers associated with the type of locality determined.

2. The system of claim 1, wherein the control unit is operative to determine the strong temporal locality or the strong spatial locality being involved on the basis of an addressing mode of the main memory.

3. The system of claim 2, wherein the processor comprises a decode unit connected to the control unit and operative to discriminate between a direct addressing mode and an indirect addressing mode for informing the control unit of which of the address modes is involved.

4. A method of caching data in a computer system with:

a processor for operating on operands under control of instructions;

a main memory for storage of the operands;

a data cache between the main memory and the processor for prefetch and storage of specific ones of the operands referenced by the instructions;

wherein the data cache comprises:

an S-buffer for storage of a plurality of the operands with strong temporal locality;

a P-buffer for storage of a plurality of the operands with strong spatial locality;

wherein the method comprises:

determining whether the operand referenced involves either the strong temporal locality or the strong spatial locality; and controlling operation of a particular one of the buffers associated with the type of locality determined.

5. A computer system, comprising:

a processor for operating on operands under control of instructions;

a main memory storing the operands;

a data cache between the main memory and the processor for storage of specific ones of the operands referenced by the instructions, said data cache including an S-buffer for storage of a plurality of the operands with strong temporal locality and a P-buffer for storage of a plurality of operands with strong spatial locality, each of the P-buffer and the S-buffer including a plurality of blocks;

a control unit communicating with the processor, the cache and the main memory;

the processor further including means, upon detection of an operand reference in an instruction, for determining the addressing mode and the registers used and communicating the addressing modes and registers so determined to the control unit, the control unit including means for categorizing a referenced operand as an S-reference corresponding to the S-buffer or P-reference corresponding to the P-buffer, from the addressing mode and registers determined by the processor, for checking both the S-buffer and the P-buffer for the presence of the referenced operand, for, in the case of a referenced operand not being present in the P-buffer and the S-buffer, fetching the referenced operand from the main memory and storing the fetched reference in the respective buffer, for not changing the S-buffer and P-buffer if (i) the referenced operand is an S-reference present in the S-buffer or in the P-buffer, and (ii) the referenced operand is a P-reference in the P-buffer, for, in the case of a referenced operand being an S-reference present in the P-buffer, transferring the cache block corresponding to the S-reference from the P-buffer to the S-buffer, and marking the P-buffer cache block from which the operands were transferred as empty, and for sequentially prefetching operands for the P-buffer but not for the S-buffer.

6. A method of handling data operands in a computer system having a processor, a main memory and a data cache having a plurality of cache blocks, said method comprising the steps of:

allocating a first plurality of cache blocks as an S-buffer for storage of a plurality of the operands with strong temporal locality and a P-buffer for storage of a plurality of operands with strong spatial locality;

detecting an operand referenced in an instruction and determining the addressing mode and the registers used;

categorizing a referenced operand as an S-reference corresponding to the S-buffer or P-reference corresponding to the P-buffer from the determined addressing mode and registers;

checking both the S-buffer and the P-buffer for the presence of the referenced operand, in the case of a referenced operand not being present in the P-buffer and the S-buffer, fetching the referenced operand from the main memory and storing the fetched reference in the respective buffer;

leaving the S-buffer and P-buffer unchanged if (i) the referenced operand is an S-reference present in the S-buffer or in the P-buffer, and (ii) the referenced operand is a P-reference in the P-buffer;

in the case of a referenced operand being an S-reference present in the P-buffer, transferring the cache block corresponding to the S-reference from the P-buffer to the S-buffer, and marking the cache block from which the operands were transferred as empty; and sequentially prefetching operands for the P-buffer but not for the S-buffer.

* * * * *